United States Patent

Burk

[15] 3,676,649

[45] July 11, 1972

[54] SIGNAL ANALYSIS AND RECORDING

[72] Inventor: Marvin C. Burk, Bartlesville, Okla.

[73] Assignee: Phillips Petroleum Company

[22] Filed: May 8, 1970

[21] Appl. No.: 35,840

[52] U.S. Cl..............................235/151.3, 73/23.1, 444/1
[51] Int. Cl......................................G01n 31/08, G06f 15/34
[58] Field of Search........................235/151.35, 151.3, 183; 210/31; 324/77 A; 73/23.1

[56] References Cited

UNITED STATES PATENTS 3,498,106   3/1970   Fuller et al..............................73/23.1
3,535,084   10/1970  Izawa et al.............................73/23.1 X

OTHER PUBLICATIONS

P. R. Briggs; " Computer-Controlled Chromatographs;" Control Engineering; Vol. 14, No. 9; September. 1967; pp. 75– 80.

*Primary Examiner*—Eugene G. Botz
*Assistant Examiner*—Edward J. Wise
*Attorney*—Young and Quigg

[57] ABSTRACT

Areas of peaks in a chromatogram or similar signal are computed from measurements of the amplitudes at spaced time intervals. Amplitudes at selected sampling points between the spaced time intervals are calculated. The areas are computed by selectively summing the measured and calculated amplitudes.

3 Claims, 4 Drawing Figures

INVENTOR.
M.C. BURK

SIGNAL ANALYSIS AND RECORDING

Chromatographic analyzers have recently been developed which are capable of analyzing fluid mixtures containing large numbers of constituents. Some of these analyzers employ a plurality of columns which are filled with different partitioning materials and which may be operated at different temperatures. In order to handle the large amount of data generated by an analyzer of this type, recording systems utilizing high speed digital computers have been developed. It is common practice to compute the areas of individual peaks to establish signals which are representative of the concentrations of the constituents represented by the peaks. In most operations, from 15 to 30 spaced measurements of the amplitudes of a single peak are adequate to characterize the peak and measure its area.

In most chromatographic separations the peaks which appear in the column effluent toward the end of the analysis cycle are considerably wider than those which appear earlier in the cycle. It is desirable that the individual sample points be spaced substantially equally on a time scale in order to provide an accurate measurement of the area of the peak. This requires a variable time base for the data sampling system in order to accommodate peaks of different widths. While such a variable time base can be constructed or programmed into a computer, the equipment or program becomes quite complex when signals from a plurality of columns are to be applied to the computer on a time sharing basis.

In accordance with this invention, a system is provided for sampling data, such as the output signal from a chromatographic column, at generally equally spaced time intervals which are selected in accordance with the time duration of the data to be sampled. The system is programmed so that the sampling interval varies with respect to time in accordance with the widths of peaks obtained from a chromatographic analyzer. The output signal is actually measured at a plurality of uniform time intervals, but is recorded only at time intervals spaced to provide the desired number of sample points for a given peak. Areas of peaks are computed from the measured and calculated amplitudes.

In the accompanying drawing.

Figure 1:
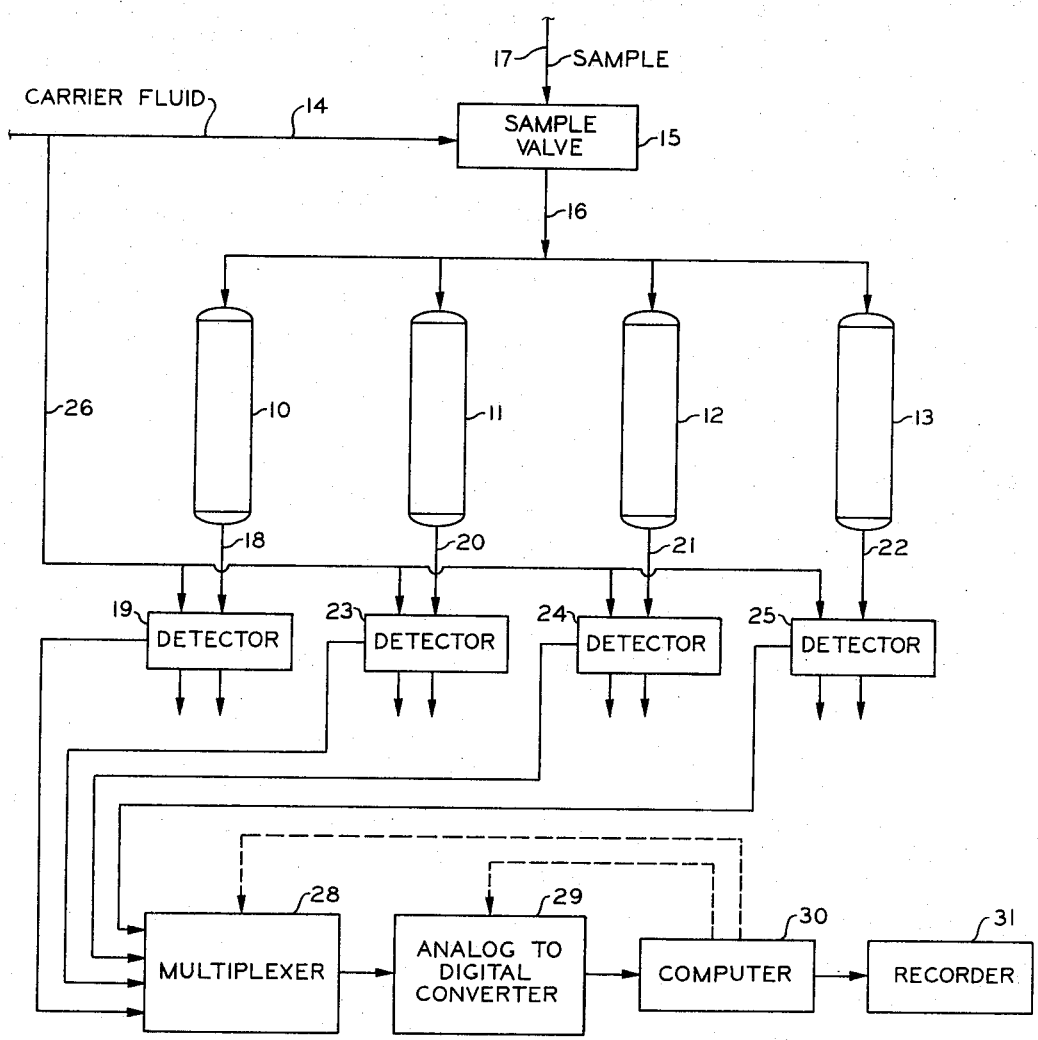
FIG. 1 is a schematic representation of a chromatographic analyzer having the signal sampling and recording apparatus of this invention incorporated therein.

Referring now to the drawing in detail and to FIG. 1 in particular, there are shown four individual chromatographic columns 10, 11, 12 and 13. These columns are filled with suitable partitioning materials to separate constituents of a sample to be analyzed. The individual columns can be filled with different materials and can be operated at different temperatures so that each column performs an efficient separation between selected constituents of the sample. A carrier fluid is introduced into the system through a conduit 14 which communicates with a sample valve 15. The outlet of valve 15 is connected by a conduit 16 to the inlets of the four columns. A sample to be analyzed is introduced into valve 15 through a conduit 17. Valve 15 can be actuated periodically to introduce a predetermined volume of the sample into the carrier fluid so that the mixture is introduced into the four columns. These four columns can contain different packing materials and can be operated at different temperatures. The effluent from column 10 is directed through a conduit 18 to the first inlet of differential detector 19. Similarly, effluent streams from columns 11, 12 and 13 are passed through respective conduits 20, 21 and 22 to individual detectors 23, 24 and 25. A portion of the carrier fluid is directed through a conduit 26 to the second inlets of the four detectors. The output signals from the detectors, which are representative of differences between the composition of the column effluent streams and the carrier fluid, are transmitted to a multiplexer 28.

The output of multiplexer 28 is applied to the input of an analog to digital converter 29. The output signals from the individual detectors are thus converted in the sequence to be described into corresponding digital signals. These digital signals are transmitted to a computer 30, which can be a conventional high speed digital computer provided with a storage means. As will be described hereinafter in greater detail, computer 30 measures the areas of the peaks of the output signals from the detectors. The output of the computer can subsequently be applied to a suitable recorder 31 or to other processing or control equipment, not shown. The operations of multiplexer 28 and converter 29 are controlled by computer 30.

Figure 2:
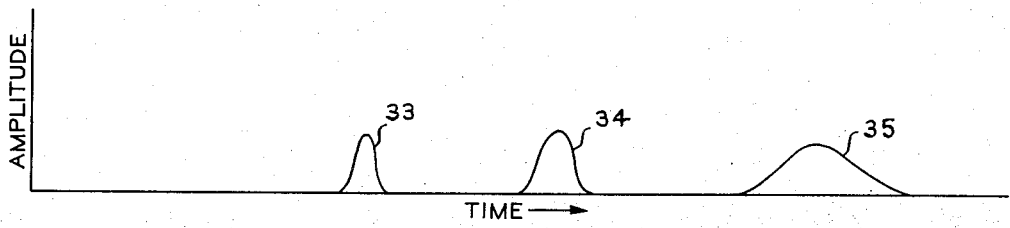
FIG. 2 represents a typical chromatogram obtained from one of the detectors of FIG. 1.

FIG. 2 illustrates a typical chromatogram of the type obtained by a conventional chromatographic analyzer. This chromatogram contains three peaks 33, 34 and 35 which represent the presence of three individual constituents of a sample mixture. These peaks normally tend to be wider when they appear at later times due to the greater affinity of the constituents for the partitioning material in the column. In order to measure the areas of the individual peaks after they have been converted to digital form, it is desirable to measure the amplitudes of the peaks at a plurality of generally equally spaced time intervals and to sum the measured amplitudes. For most purposes, some 15 to 30 measurements per peak are adequate. It can be seen from an inspection of FIG. 2 that the measuring points must be spaced considerably closer together for peak 33 than for peak 35 if generally equally spaced sample measurements are to be made.

Figure 3:
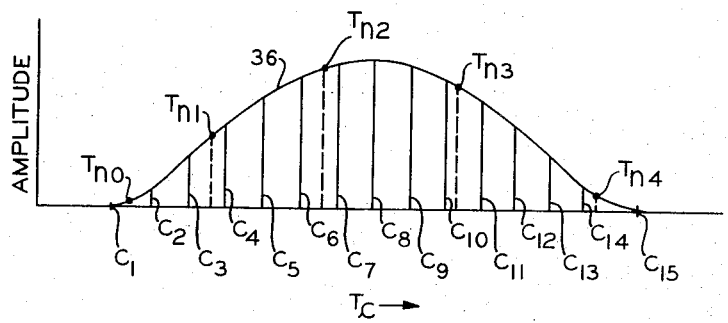
FIG. 3 illustrates data sampling features of this invention.

The data sampling and recording procedure of this invention is illustrated in FIG. 3 wherein a typical chromatogram peak 36 is shown. For purposes of illustration, it will be assumed that five measurements are adequate to define the area of the peak. These five measurements are made in times $T_{n0}$ to $T_{n4}$. However, the actual signal sampling means is actuated at a relatively large number of equally spaced sample times designated by the vertical lines $C_1$ to $C_{14}$. The frequency of these timing times should be at least as high as the "frequency" of the desired measurements of the peak having the least width, peak 33 in FIG. 2, for example. In actual practice, there are some 15 to 30 $T_n$ points selected for each peak instead of the five illustrated in FIG. 3.

In accordance with this invention, the increments of area under the curve between the $T_n$ points are calculated from measurements made at the C times. The times are sufficiently close that measurements of amplitudes can be taken as being representative of areas between measurement points. For example, the measured amplitude of $C_3$ can represent the area under the curve between times $T_{c3}$ and $T_{c2}$. Since many of the $T_n$ times do not occur at a $T_c$ time, it is necessary to interpolate to obtain proper values. At a time corresponding to $C_4$, for example, the area $N_1$ under curve 36 between times $T_{n0}$ and $T_{n1}$ can be approximated quite closely from the following equation:

$$N_1 = \left(\frac{T_{c2} - T_{n0}}{T_{c2} - T_{c1}}\right) C_2 + C_3 + \left(\frac{T_{n1} - T_{c3}}{T_{c4} - T_{c3}}\right) C_4 \qquad (1)$$

where the various $T$ values are the times indicated by the subscripts and $C_2$, $C_3$ and $C_4$ are the amplitudes of curve 36 at the indicated times. If the $T_n$ times are spaced farther apart, $C_3$ can represent more than one term. The "area" is thus approximated by summing a series of amplitudes. The first and last terms of equation (1) are interpolated values because measurements are not actually made at times $T_{n0}$ and $T_{n1}$. Measurements are made only at the C times. The first term of equation (1) represents a fraction B of the area between times $T_{c1}$ and $T_{c2}$, whereas the second term $C_3$ is considered to be representative of the area between times $T_{c2}$ and $T_{c3}$. The last term of equation (1) represents a fraction (1-B) of the area between times $T_{c3}$ and $T_{c4}$, where 1 is the unit of time between the $T_c$ times. The time $T_{n2}$ of the next measurement point can be calculated from an equation of the form $$T_{n2} = T_{n1} + PT_{n1} + Q \qquad (2)$$

where $P$ and $Q$ are constants. Equation (2) demonstrates that the intervals between successive measurement points increase progressively with respect to time. This corresponds to the broadening of the peaks of FIG. 2. The constants $P$ and $Q$ of equation (2) can be obtained empirically from a conventional chromatogram of the type shown in FIG. 2 which is made by using a sample of material of the type to be analyzed. It is then a matter of routine curve fitting to establish the constants for an equation (2) which describes the increase in width of the peaks with respect to time. While the increase in time between measurement points may be appreciable between peaks such as 33 and 35, the increase is not appreciable during an individual peak.

Figure 4:
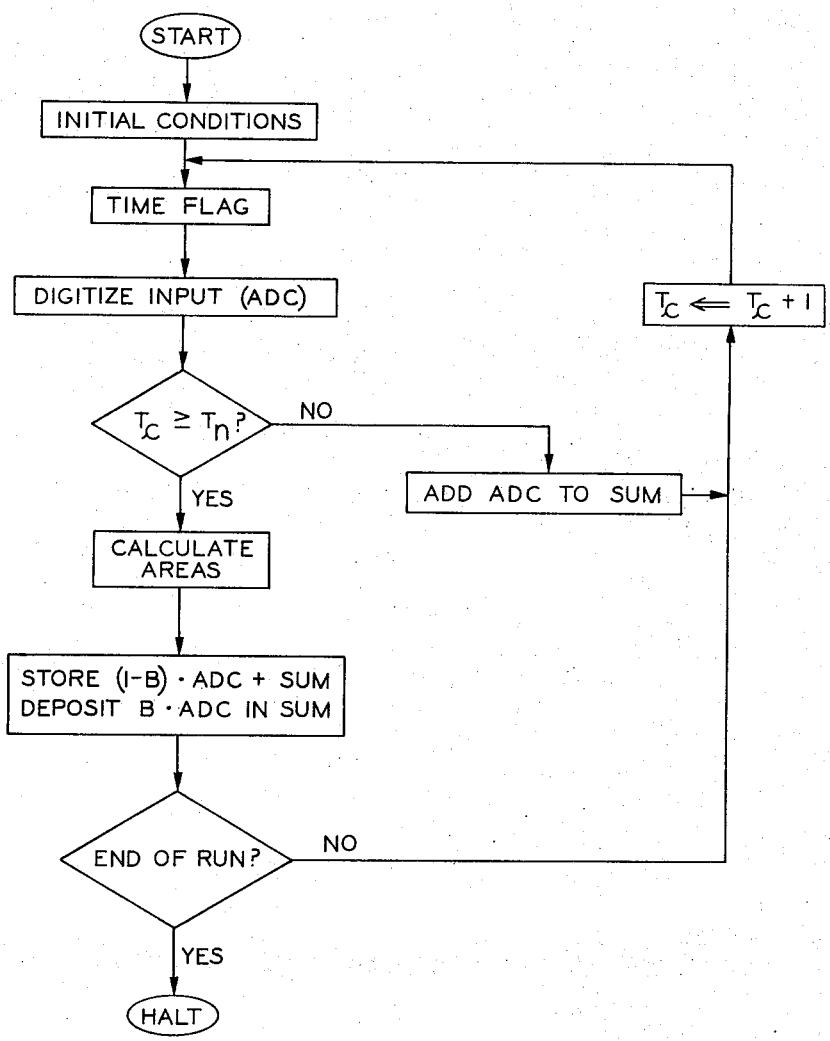
FIG. 4 is a schematic illustration of the operation of the computer of FIG. 1.

The foregoing calculations can readily be made by means of a digital computer which is programmed to carry out the operations in the sequence illustrated schematically in FIG. 4. The data sampling and recording procedure is started initially at some time which is later than the time at which sample valve 15 is actuated to introduce sample into the columns. A conventional programmer, not shown, can be employed to operate the sample valve and to start the data sampling operation following a predetermined time interval. The first step of the data sampling operation is to establish initial conditions. The summing means within the computer are set to zero at this time. Each individual recording or calculation to be described takes place at the end of a time interval designated by Time Flag. These time intervals can be established by a signal generator having a frequency of 60 cycles per second, for example. This corresponds to the C times of FIG. 3. At the end of each such interval, analog to digital converter 29 is actuated to convert the detector signal to a digital value (ADC) representative of the amplitude of the curve at this time. The resulting ADC signal is transferred to a decision making operation wherein the current $T_c$ measurement time is compared with the next $T_n$ time. The computer progressively calculates the $T_n$ times by means of equation (2). If the current $T_c$ time is not equal to or greater than the next $T_n$ time, a "no" signal is established. This results in the measured ADC value being added to the sum being accumulated within the computer. For example, at time $T_{c3}$, the value $C_3$ (ADC at time $T_{c3}$) is added to equation (1). The "no" signal also adds one to the current $T_c$ time to replace ( $<=$ ) this time by a new $T_c$ time one unit larger. This new $T_c$ time is used in the next cycle of operation. At such time, $T_{c4}$, for example, $T_{c4}$ is greater than $T_{n1}$, as shown in FIG. 3. This produces a "yes" signal and causes the computer to make a calculation in accordance with equation (1). As result of this calculation, a term B, which is equal to $T_{c4} - T_{n1}$, is established. The next $T_n$ is also computed. The value $(1-B) \cdot ADC + Sum$ is stored to represent an increment of the area under the curve. This corresponds to equation (1) wherein $(1-B) \cdot ADC$ represents the term $$\left(\frac{T_{n1} - T_{c3}}{T_{c4} - T_{c3}}\right) C_4$$

and Sum is the remainder of the terms of equation (1) previously accumulated. At the same time the quantity $B \cdot ADC$ is deposited in a temporary summing means to constitute the first term of the next equation corresponding to equation (1), thus starting the next Sum. At this time a signal is sent to a second decision making unit to determine if the run has been completed. If so, the operation is halted. If not, a signal is sent to the $T_c <= T_c + 1$ unit. At this same time the computer establishes the next $T_n$ value from equation (2), the constants $P$ and $Q$ having been set in the computer. When all of the summed signals for a peak have been stored, they are in turn summed to provide an integrated value of the peak.

The beginning of each integration period can be controlled by a programmer, either external or included in the computer. An adjustable external programmer of the type described in U.S. Pat. No. 3,119,995 can be employed, for example.

The computer operation illustrated in FIG. 4 is repeated for each column of the analyzer of FIG. 1 on a time shared basis. Of course, more or fewer than four columns can be employed. The original data can be processed as the analyses proceed if a relatively high speed computer is available. As an alternative, all of the original data can be stored initially and subsequently reproduced and stored.

While this invention has been described in conjunction with a presently preferred embodiment, it obviously is not limited thereto.

What is claimed is:

1. The method of analyzing a fluid mixture which comprises:
    1. introducing a sample of a fluid mixture to be analyzed into a chromatographic column,
    2. passing carrier fluid through the column to elute the constituents from the column in succession,
    3. passing the column effluent through a detector to establish first output signals, the amplitudes of which are indicative of the presence and concentration of the constituents of the fluid mixture, said first output signals constituting a series of peaks,
    4. converting said first signals into corresponding second signals in digital form,
    5. and measuring the areas under said series of peaks by applying said second signals to a digital computer which is programmed to:
        a. measure the amplitudes of the peaks periodically at a plurality of equally spaced time intervals and establish a series of third signals representative of the measured amplitudes,
        b. calculate from the third signals the amplitudes of the peaks at a plurality of times which are spaced from one another by progressively different time intervals which correspond to the progressively different widths of the peaks to be measured, the equally spaced time intervals being shorter than the time intervals at which the amplitudes of the peaks are calculated, and
        c. sum the measured third signals and the calculated amplitudes so as to establish final output signals representative of the areas of each of the peaks.

2. The method of claim 1 wherein each of the times of step (5) (b) is calculated from an equation of the form $$T_n = T_{(n-1)} + PT_{(n-1)} + Q$$

where $T_n$ is the time at which a given calculation is to be made, $P$ and $Q$ are constants, and $T_{(n-1)}$ is the time immediately preceding the given calculated time $T_n$.

3. The method of claim 2 wherein the area $N_1$ between times $T_{(n-1)}$ and $T_n$ is calculated from an equation of the form $$N_1 = \left(\frac{T_{c2} - T_{n0}}{T_{c2} - T_{c1}}\right) C_2 + C_3 + \frac{T_{n1} - T_{c3}}{T_{c4} - T_{c3}} C_4$$

where $T_{c1}$ is the end of the equally spaced time interval immediately preceding time $T_{n-1}$, $T_{c2}$ is the end of the equally spaced time interval immediately following time $T_{n-1}$, $C_2$ is the measured amplitude of the peak at time $T_{c2}$, $T_{c3}$ is the end of the equally spaced time interval immediately preceding time $T_n$, $T_{c4}$ is the end of the equally spaced time interval immediately following time $T_n$, $C_4$ is the amplitude of the peak at time $T_{c4}$, and $C_3$ is the sum of the measured amplitudes between time $T_{c2}$ and $T_{c4}$.

* * * * *